Aug. 25, 1953     E. A. PETERSON     2,649,635
PIVOTED LEVER TYPE LINE CLAMP
Filed July 5, 1950
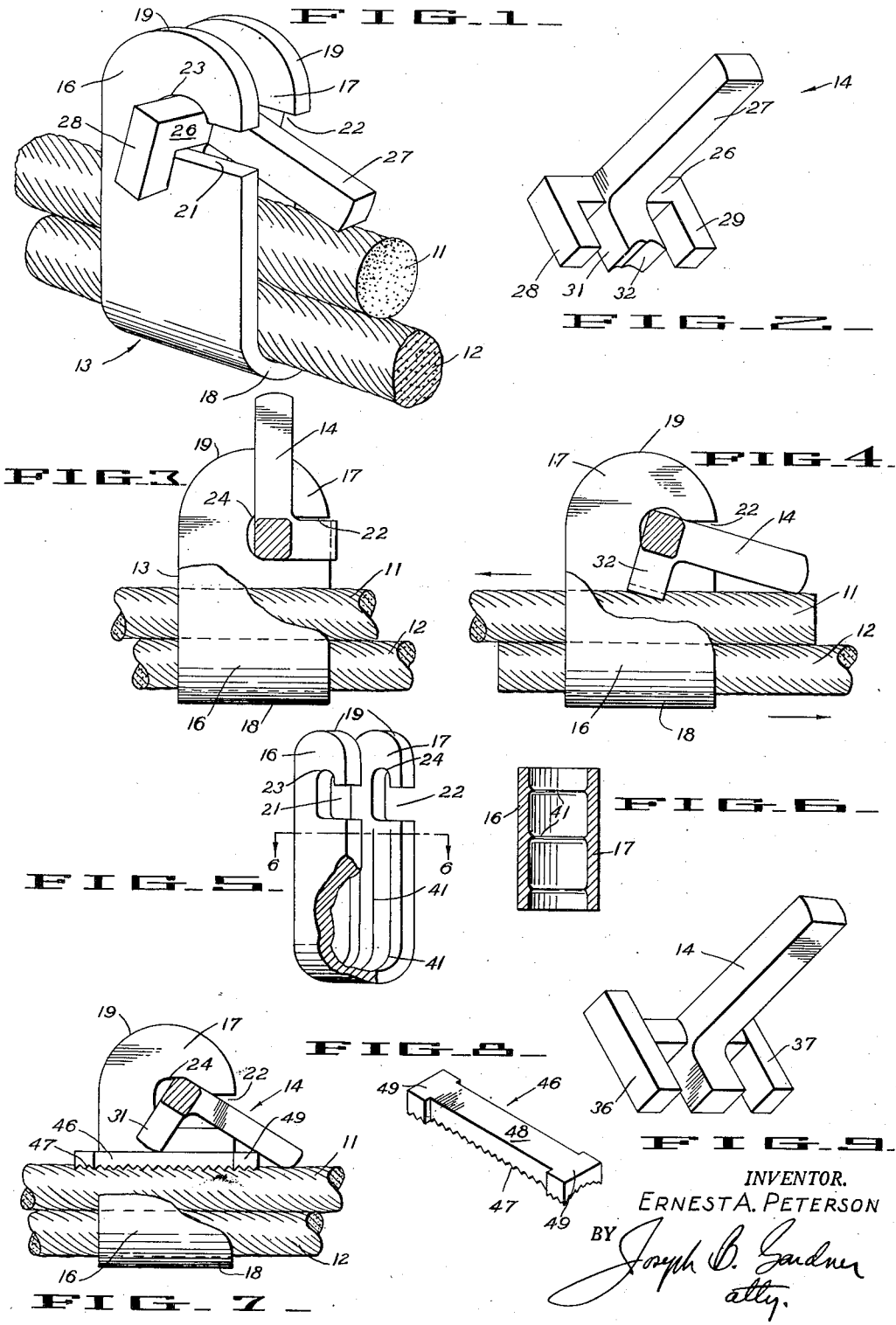
INVENTOR.
ERNEST A. PETERSON Patented Aug. 25, 1953

2,649,635

UNITED STATES PATENT OFFICE 2,649,635

PIVOTED LEVER TYPE LINE CLAMP

Ernest A. Peterson, Oakland, Calif.

Application July 5, 1950, Serial No. 172,140

1 Claim. (Cl. 24—134)

This invention relates to line clamping means, and more particularly to a device which may be readily attached to a double strand of cable or the like so as to prevent relative displacement of the strands.

There has long been a need for a simple device which can be quickly and selectively clamped to or released from a pair of lines of cable, wire or the like whereby the lines will be securely maintained against relative movement. Such a device can be used when it is necessary to temporarily splice two lines together, or when it is desired to hold a bight in a single line. It is clear that when rope or similar flexible material is utilized, it is generally not too difficult to tie easily-loosened knots to accomplish the foregoing. However, when steel cable or wires are used, the limited degree of flexibility of the material prevents such easy attachment, and it is for this reason that numerous devices have heretofore been produced which could be used to splice a pair of cables. The most common of the prior art devices comprises a C-shaped member having threaded ends, a plate element with apertures to receive the free ends of the C-member, and a pair of nuts threadedly engaged with such ends. When the lines are placed in the C-member, and the nuts tightened, the plate element will be urged into intimate engagement with one of the lines and frictionally secure the lines in place. This type of clamp has been widely used, but has not met with enthusiastic acceptance because of the amount of time required to secure the same to the lines. Other devices, while possibly shortening this time element, are either extremely complicated or unwieldy, or due to their excessive cost prevent their widespread acceptance by the trade.

It is therefore an object of the present invention to provide a clamping device which can be readily applied to a plurality of cables or like elements whereby said cables will be securely and frictionally maintained against relative axial displacement.

A further object of my invention is to provide a simplified clamping device for a plurality of cables wherein said device may be selectively secured to or released from the cables by a single manual operation of the user.

A still further object of my invention is to provide a device of the character described in which improved cable securing and locking means are incorporated therein and by means of which the cables may be frictionally engaged around the greater portion of their respective peripheries.

Yet another object of this invention is to provide a cable clamp which is inexpensive to manufacture, but which is sufficiently rugged to withstand the normal loads or abnormal stresses which may be imposed on it while being secured to the cables.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and specification may be adopted within the scope of the invention as set forth in the claim.

Referring to the drawing:

Figure 1 is a perspective view of my improved clamp showing the same in operative engagement with a pair of cables.

Figure 2 is a perspective view of the cam element of the device.

Figure 3 is a side elevational view of the structure shown in Figure 1 illustrating the cam element in its free position, portions of the device being broken away in order to more clearly disclose the internal construction.

Figure 4 is a view similar to that of Figure 3 illustrating the cam element in its cable engaging position.

Figure 5 is a perspective view of a slightly modified form of the clamp portion of the device.

Figure 6 is a cross-sectional view taken along the plane indicated by the lines 6—6 of Figure 5.

Figure 7 is a side elevational view of another modified form of my invention, portions of the view being broken away in order to more clearly illustrate the internal construction.

Figure 8 is a perspective view of a portion of the clamp disclosed in Figure 7.

Figure 9 is a perspective view of a slightly modified cam element.

Referring to Figure 1 of the drawing, my device is shown in operative engagement with two cables 11 and 12 respectively, the cables either being two separate lines, or being part of the same line which may have been doubled back on itself. It will be understood that when the word cable is used, such word is intended to include wire, rope or similar elements, as the clamp may be successfully utilized with any of such materials. The clamping device is preferably formed of metal and comprises two primary elements, first a U-shaped member 13 for receiving the cables, and second, a cam 14 for urging the latter into intimate and frictional locking engagement with the member 13.

As best shown in Figures 1 and 3, the member 13 includes a pair of parallel spaced ears 16 and 17 joined together along their bottom edges by an intermediate curved section 18. The ears are here shown as being substantially rectangular in shape and are spaced apart sufficiently to receive the cables with the peripheries of the latter elements in relatively snug engagement with the inner walls of the ears. The upper ends of the ears may be curved as shown at 19 in order to eliminate sharp corners which might cause injury to the worker when using the device. Matching slots 21 and 22 are also provided in the ears, the slots being positioned transversely across and extending to approximately the center of the widths thereof, and arranged to receive the cam element 14. It will also be noted that the terminal ends of the slots are provided with enlarged radial portions 23 and 24 respectively for a purpose to be hereinafter described.

The cam 14, as here shown, is in the form of a T-bar, and comprises a flange 26, and an arm 27 extending at right angles from the center of the flange. Disposed normally to the general plane of arm 27 and extending from the distal ends of the flange 26 are a pair of locking lugs 28 and 29, and a cam lug 31 forming an angular extension of arm 27. It will be noted that the thickness of the material of the flange 26 and its associated lugs is sufficiently small to enable the cam 14 to be inserted in the slots 21 and 22 when the arm is in the vertical position shown in Figure 3. However, upon rotation of the cam until it assumes the position shown in Figure 4, the depth of the flange will prevent its being withdrawn from the slots due to the entry of a portion of the flange into the terminal portions 23 and 24 of the slots. It will thus be seen that the cam 14 may be easily inserted into the U-member 13, so long as the arm 27 is in its upright position, but when the arm is pivoted to the horizontal or locking position indicated in Figures 1 and 4, release of the cam requires a deliberate lifting action.

The cables are securely engaged in the U-member due to the downward pressure exerted on the uppermost cable by locking lug 31, the latter element preferably being grooved or notched on the face 32 in order to effect a biting action on the cable when the cam is in its locking position. As best seen in Figure 4, the lug 31 actually compresses an upper portion of cable 11, and so long as the load on the cable is exerted in the direction of the arrow, the cam locking lug will increase its locking force with any increase in the load. If desired, several of the units may be placed at spaced positions along the cable thereby further increasing the loads that may be safely carried, and also it is contemplated to face alternate U-members in opposite directions whereby directionally opposite loads will be carried by alternate clamps. The lugs 28 and 29 are utilized to prevent the ears from flexing outwardly when lateral forces are imposed thereon, such lugs preferably extending downwardly to engage the outer faces of the ears at positions adjacent the maximum stress lines. However, if desired, the lugs may extend upwardly and as shown in Figure 9, lugs 36 and 37 are provided which will engage portions of the ears both above and below the U-member slots.

In Figures 5 and 6, I have illustrated a somewhat modified form of U-member. In this case the inner surface of the ears 16 and 17 below the slots is provided with a plurality of preferably continuous protuberances 41 forming a modulated recess for reception of the cables. With this form of U-member, the protuberances will greatly increase the frictional locking strength of the device.

In Figures 7 and 8, a further modified form of the invention is illustrated. The U-member is similar to those heretofore described, except that the distance between the lower portion 18 and the slots is slightly greater in order to accommodate a locking plate 46 between the upper surface of the cable 11 and the slots. The plate 46 is corrugated or notched on its lower surface 47 and is arranged to overlie the entire length of cable inserted between the ears. In this manner, when the cam 14 is placed in its locking position, the cam lug 31 will engage the upper surface 48 of the plate 46 and forcibly depress the latter against the cable 11. Thus, instead of the single contact of the cam lug with the cable, the plate will engage a greater portion of the cable length and thereby increase the holding power of the clamp. It will be noted that the plate is provided with flanges 49 at the ends thereof, such flanges engaging the edges of the ears and preventing displacement of the plate in the direction of the cable load. The plate may be easily inserted in the U-member by dropping it into position from the open end of the member. The disadvantage of using an extra element in this form of clamp is overcome by the added strength gained, and for many installations, this embodiment of my invention will be preferably used.

It will thus be seen that I have provided an extremely simple and inexpensive clamping device which can be inserted on a plurality of cables in a fraction of the time heretofore required for the same operation. As there are no delicate parts such as threads, the clamp may be used over long periods of time and absorb repeated hammer blows when the cam is being forced into its locking position without rendering the device inoperative.

I claim:

Apparatus for clamping a pair of cables or the like against relative displacement comprising a cable receiving member and a cam member, said cable receiving member comprising a vertically extending bifurcated holder, each of the furcations comprising an ear arranged to be in relatively snug engagement with a horizontally disposed cable placed between the ears, aligned slot means in each of the ears, extending substantially parallel to the cable when placed between the ears, each slot having an enlarged terminal portion, said cam member comprising a bar of substantially rectangular cross section proportioned to fit said slots and to turn in said enlarged portion, said cam member having arms projecting perpendicularly to said bar outside said ears to prevent spreading thereof, and an activating arm substantially perpendicular to said bar, a cable engaging means depending from said bar intermediate said arms and adapted to engage and clamp said cable when said cam member is turned to a position wherein a diagonal of the cross section cooperating with the enlarged slot terminals prevents withdrawal of the clamping means.

ERNEST A. PETERSON.

References Cited in the file of this patent

UNITED STATES PATENTS

| Number | Name | Date |
|---|---|---|
| 403,620 | Stiles | May 21, 1889 |
| 552,501 | Snively | Dec. 31, 1895 |
| 644,118 | Wiley | Feb. 27, 1900 |
| 805,675 | Shive | Nov. 28, 1905 |
| 856,256 | Herbert | June 11, 1907 |
| 1,146,083 | Lord | July 13, 1915 |
| 1,921,286 | Erickson | Aug. 8, 1933 |
| 1,936,323 | Bowen | Nov. 21, 1933 |

FOREIGN PATENTS

| Number | Country | Date |
|---|---|---|
| 47,065 | France | Dec. 14, 1936 |